US011953013B2

(12) United States Patent
Titinen et al.

(10) Patent No.: US 11,953,013 B2
(45) Date of Patent: Apr. 9, 2024

(54) CENTRIFUGAL PUMP FOR PUMPING A MULTIPHASE SUSPENSION AND A GAS REMOVAL DEVICE FOR USE IN A CENTRIFUGAL PUMP

(71) Applicant: Sulzer Management AG, Winthterthur (CH)

(72) Inventors: Kalle Titinen, Tampere (FI); Janne Ripattila, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 18/038,922

(22) PCT Filed: Oct. 27, 2021

(86) PCT No.: PCT/EP2021/079882

§ 371 (c)(1),
(2) Date: May 25, 2023

(87) PCT Pub. No.: WO2022/135775

PCT Pub. Date: Jun. 30, 2022

(65) Prior Publication Data

US 2024/0026884 A1 Jan. 25, 2024

(30) Foreign Application Priority Data

Dec. 21, 2020 (EP) .................................... 20216135

(51) Int. Cl.

| | |
|---|---|
| ***F04D 1/06*** | (2006.01) |
| ***F04D 1/04*** | (2006.01) |
| ***F04D 9/00*** | (2006.01) |

(52) U.S. Cl.

CPC ................. *F04D 1/06* (2013.01); *F04D 1/04* (2013.01); *F04D 9/003* (2013.01); *F05D 2240/122* (2013.01); *F05D 2250/51* (2013.01)

(58) Field of Classification Search

CPC ... F04D 1/06; F04D 1/04; F04D 9/003; F04D 29/4273; F04D 31/00; F04D 7/045; (Continued)

(56) References Cited

U.S. PATENT DOCUMENTS

2013/0045081 A1 2/2013 Conway

FOREIGN PATENT DOCUMENTS

| | | |
|---|---|---|
| AT | 246671 B | 4/1966 |
| FR | 773522 | 11/1934 |
| WO | 0058630 A1 | 10/2000 |

OTHER PUBLICATIONS

International Search Report and Written Opinion dated Jan. 14, 2022 in corresponding International Application No. PCT/EP2021/079882.

*Primary Examiner* — Brandon D Lee
(74) *Attorney, Agent, or Firm* — GLOBAL IP COUNSELORS, LLP

(57) ABSTRACT

A centrifugal pump includes a pump housing having a suspension inlet and a suspension outlet and a flow channel between the inlet and the outlet, a shaft mounted by bearings for rotation about a center axis, an impeller which is rotatable by the shaft, in alignment with the inlet and arranged to be rotated about the axis in the flow channel, and gas collecting openings for gas removal arranged in the flow channel. The inlet end of the flow channel includes a number of static vanes comprising gas collecting openings, the vanes extend radially from an inner wall of the flow channel toward the center of the flow channel and are upstream of the impeller.

15 Claims, 6 Drawing Sheets

(58) Field of Classification Search
CPC ...... F04D 7/04; F04D 29/448; F05D 2250/51; F05D 2240/122; F05D 2250/191; F05D 2250/291
See application file for complete search history.

CENTRIFUGAL PUMP FOR PUMPING A MULTIPHASE SUSPENSION AND A GAS REMOVAL DEVICE FOR USE IN A CENTRIFUGAL PUMP

CROSS-REFERENCE TO RELATED APPLICATION

This application is a U.S. National Stage application of PCT/EP2021/079882, filed Oct. 27, 2021, which claims priority to European Application No. 20216135.2, filed Dec. 21, 2020, the contents of each of which are incorporated herein by reference.

BACKGROUND

Technical Field

The present disclosure relates to a centrifugal pump for pumping a multiphase suspension containing liquid, solid material and gas.

The present disclosure relates also to a gas removal device for use in a centrifugal pump.

Background Information

Reference EP 0298693A2 discloses a centrifugal pump that is shown generally by reference numeral 10 in FIG. 1. The pump comprises a main housing 11 including a suspension (e.g. pulp) inlet 12 and a suspension outlet 13 generally transverse to the inlet 12. A shaft 14 is mounted by bearings or the like (not shown) for rotation about axis A-A, generally in alignment with the inlet 12. The shaft 14 is hollow having a plurality of elongated slots 15, 16 therein, the slots 15, 16 being generally, although typically not exactly, parallel to the axis A-A, and allowing communication between the interior and the exterior of the hollow shaft 14. In the figured embodiment, gas in the pulp will collect at shaft 14, pass through openings 15 into shaft 14, and then will pass out through slots 16 and be discharged with the pulp out through the outlet 13.

SUMMARY

An object of the disclosure is to provide a centrifugal pump capable of pumping multiphase suspension containing liquid, solid material and gas where the gas can be efficiently separated and the pump can be operated with high net efficiency and low net positive suction head so that the performance is considerably improved compared to the prior art solutions.

An object of the disclosure is also to reduce axial bearing load of the shaft caused by gas removal in some of the prior art solutions.

An object of the disclosure is also to provide a gas removal arrangement that can be easily to cleaned or remove possible gloggings.

An object of the disclosure is also to provide a centrifugal pump capable of pumping multiphase suspension containing liquid, solid material and gas where the gas removal arrangement of the pump can be easily configured to various operating conditions in terms of suspension type, gas content, consistency and pressure.

Objects of the disclosure can be met substantially as is disclosed herein describing more details of different embodiments of the disclosure.

According to an embodiment of the disclosure a centrifugal pump for pumping a multiphase suspension containing liquid, solid material and gas, the pump comprises

- a pump housing having a suspension inlet and a suspension outlet and a flow channel between the inlet and the outlet,
- a shaft mounted by bearings for rotation about its center axis A-A,
- an impeller which is rotatable by the shaft, in alignment with the inlet and arranged to be rotated about the axis A-A in the flow channel.
- gas collecting openings for gas removal arranged in the flow channel, the inlet end of the flow channel includes a number of static vanes comprising the gas collecting openings connected to gas channels configured through the vanes, the vanes are extending radially from an inner wall of the flow channel toward the center of the flow channel, the vanes are located upstream of the impeller.

A centrifugal pump having this gas removal arrangement provides an efficient way to remove gas from the multiphase suspension at the beginning of the flow channel so that the gas does not enter the impeller of the pump and deteriorate the efficiency. As the vanes are located upstream of the impeller, a distance from the impeller to the vane depends on several factors such as relative amount of gas, flow speed, pressure, rotational speed and other flow characteristics. The distance can be in a range from very short i.e. a close proximity of less than 0.1*D (where the D stands for the diameter of the inlet) to a distance of inlet diameter (1*D) or above, such as 2 to 3*D. The efficiency performance of the centrifugal pump according to the disclosure is considerably improved. This arrangement also reduces axial load for the shaft bearings because in some prior art configurations the impeller includes gas removal openings leading to the back side of the impeller. This causes a pressure difference between the front side and the back side of the impeller thus creating equal axial load to the impeller and further to the shaft bearings.

According to an embodiment of the disclosure a gas removal device for use in a centrifugal pump is provided. The gas removal device comprises a tubular element having a first axial end and a second axial end and a flow channel between the ends, the gas removal device is configured to be coupled to an inlet of a centrifugal pump, the gas removal device comprises static vanes extending radially from an inner wall of the flow channel toward the center of the flow channel, and the vanes includes gas collecting openings, the gas removal device is configured to be located axially upstream of an impeller of the centrifugal pump. According to an embodiment the vanes are extending radially from a tubular element that is configured to the inlet end of the flow channel. This gas removal device can be installed or attached practically to any centrifugal pump being capable of pumping multiphase suspensions provided that the tubular element comprises an annular ring or flange being attachable to the pump housing.

According to an embodiment of the disclosure the gas collecting openings are connected to gas channels configured through the vane(s) for leading the gas away from the flow channel. There can be just one opening and gas channel or multiple gas openings and gas channels or multiple gas openings connected to one gas channel. The gas collecting openings are connected to a system for collecting the gas, such as a network of pipes or conduits. The system for collecting gas provides a pressure difference between the gas in the suspension and outside of the pump. The gas is led away due to the pressure difference that can be a natural pressure difference between the inlet channel and an outer side of the pump housing or assisted pressure difference by providing a vacuum system to generate a sufficient pressure difference through the gas channel.

According to an embodiment of the disclosure the vanes have an annular, elliptical, triangular or wing shaped outer cross section in the flow direction of the suspension. One aspect in designing the shape of the vanes is that the solid material should not accumulate on a leading edge of the vane. The gas collecting openings are suitably disposed at a trailing edge of the vane to reduce the risk of accumulation of solid material and also because the fluid pressure is low by the trailing edge it improves the effect of gas removal. For the same reasons the gas collecting openings can also be disposed at a backside of the vane, in respect to the flow direction when in use. For similar reasons it is also possible that the gas collecting openings are disposed at the vane end facing radially towards the center axis A-A.

Still according to an embodiment of the disclosure the gas collecting openings and following gas channels can be kept clean of any solid matter residuals so that an amount of the multiphase suspension, most suitable liquid, such as dilution water, is pressed in counter current direction to the gas channels and further to gas collecting openings. If a high pressure or impact for the liquid is utilized, possible cloggings are pressed back to the flow channel.

An embodiment of the disclosure is a pump that designed for multiphase suspension having a consistency of cellulosic fibers of 0.1 to 18 weight % (wt %) or other multiphase suspension having a consistency of 0.1 to 20 wt %.

The exemplary embodiments of the invention presented in this disclosure are not to be interpreted to pose limitations to the invention. The verb "to comprise" is used in this patent application as an open limitation that does not exclude the existence of also unrecited features. The features recited in depending claims are mutually freely combinable unless otherwise explicitly stated. The novel features which are considered as characteristic of the disclosure are set forth in particular in the appended claims.

BRIEF DESCRIPTION OF DRAWINGS

In the following, embodiments of the invention are explained in more detail with reference to the drawings.

DETAILED DESCRIPTION

Figure 1:
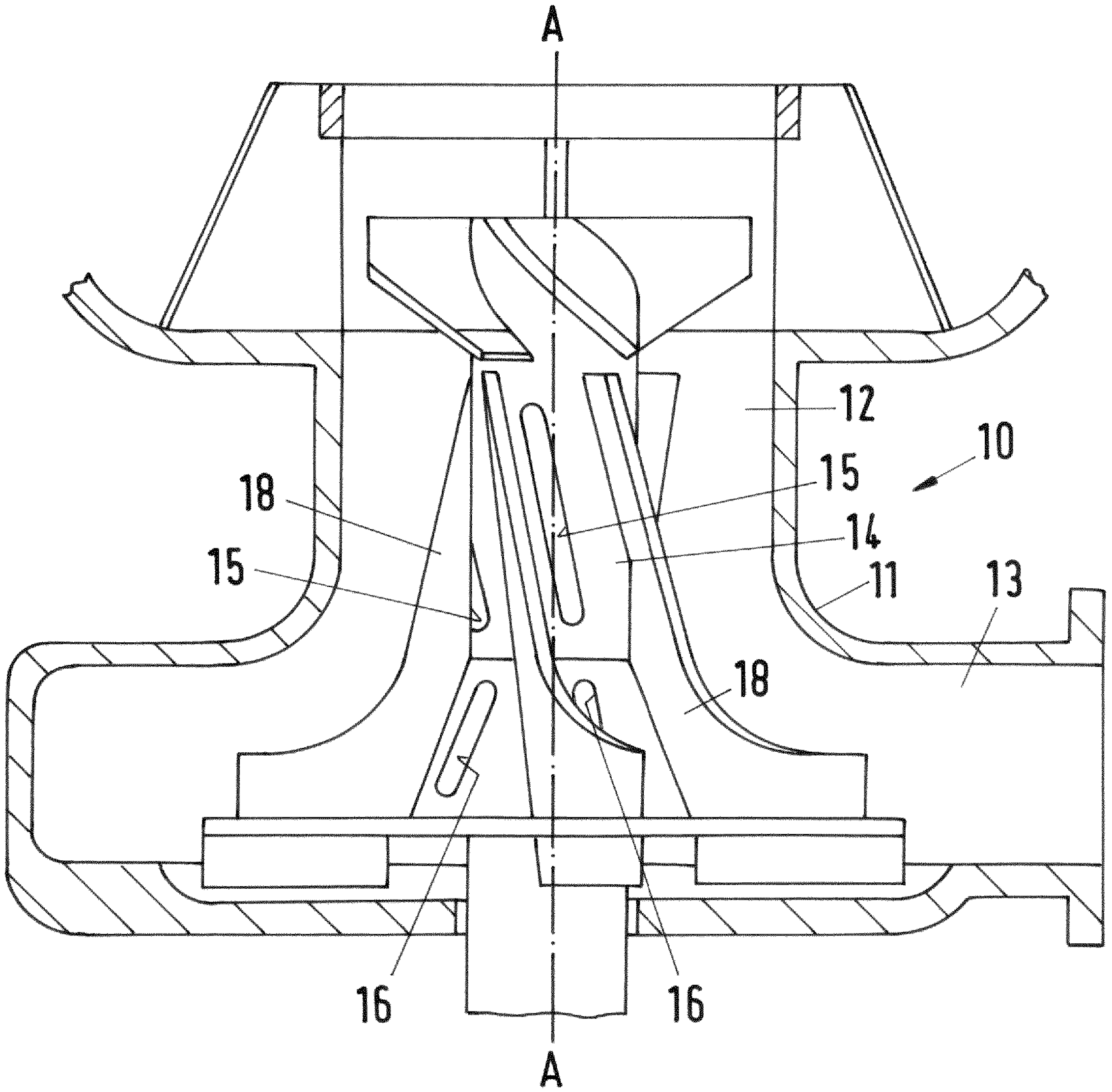
Fig.1 (Prior Art)
FIG. 1 illustrates a prior art centrifugal pump according EP0298693A2.

FIG. 1 depicts schematically an embodiment of prior art document EP 0298693A2. It discloses a centrifugal pump that is shown generally by reference numeral 10. The pump comprises a main housing 11 including a suspension (e.g. pulp) inlet 12 and a suspension outlet 13 generally transverse to the inlet 12. A shaft 14 is mounted by bearings or the like (not shown) for rotation about axis A-A, generally in alignment with the inlet 12. The shaft 14 is hollow having a plurality of elongated slots 15, 16 therein, the slots 15, 16 being generally, although typically not exactly, parallel to the axis A-A, and allowing communication between the interior and the exterior of the hollow shaft 14. In the figured embodiment, gas in the pulp will collect at shaft 14, pass through openings 15 into shaft 14, and then will pass out through slots 16 and be discharged with the pulp out through the outlet 13.

Figure 2:
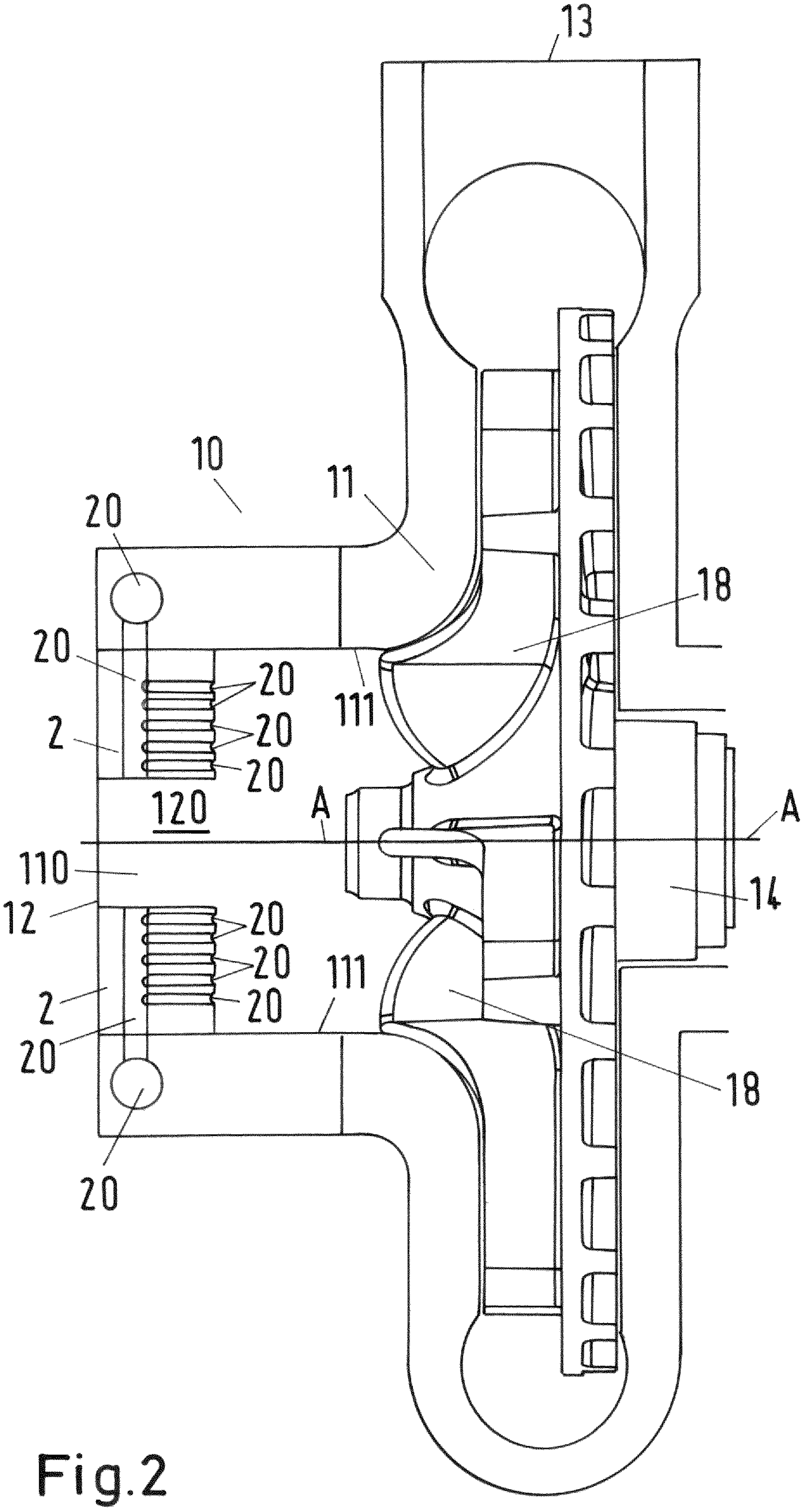
FIG. 2 illustrates a cross sectional overview of a centrifugal pump according to an embodiment of the invention.

FIG. 2 illustrates a cross sectional overview of centrifugal pump according to an embodiment of the disclosure. It is presented a centrifugal pump 10 for pumping a multiphase suspension containing liquid, solid material and gas, the pump comprising:

- a pump housing 11 having a suspension inlet 12 and a suspension outlet 13 and a flow channel 110 between the inlet 12 and the outlet 13,
- a shaft 14 mounted by bearings for rotation about its center axis A-A,
- an impeller 18 which is rotatable by the shaft 14, in alignment with the inlet 12 and arranged to be rotated about the axis A-A in the flow channel 110,
- gas collecting openings 20 for gas removal arranged in the flow channel 110,
- the inlet end 120 of the flow channel 110 includes a number of static vanes 2 comprising gas collecting openings 20, the vanes 2 are extending radially from an inner wall 111 of the flow channel 110 toward the center of the flow channel 110, the vanes 2 are located upstream of the impeller 18.

The gas collecting openings 20 are connected to gas channels 21 configured through the vane 2. According to the embodiment the gas collecting openings are disposed at a trailing edge of the vane, as shown also in FIG. 2. This trailing edge position is advantageous in several reasons, the effect is to prevent clogging and it is also optimal for gas removal due to the pressure changes at this area. The vanes 2 can also be configured so that the gas collecting openings are disposed at the vane end facing radially towards the center axis A-A. Suitably the number of vanes 2 is 1 to 6, preferably 2 to 4 vanes. The vanes 2 are attached to the pump housing 11 at the inlet end 120 of the flow channel 110.

Figure 3:
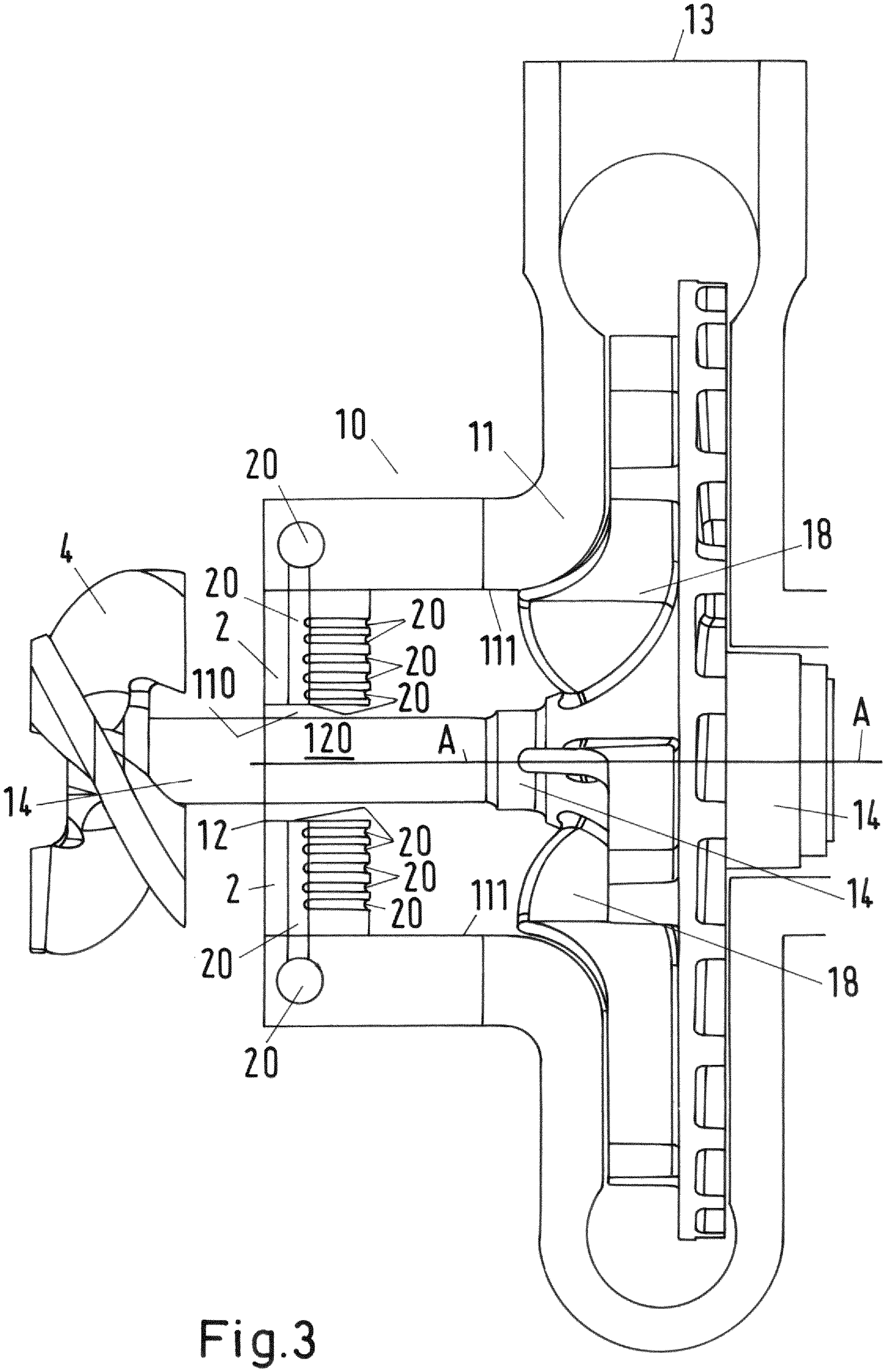
FIG. 3 illustrates a cross sectional overview of a centrifugal pump according to another embodiment of the invention.

FIG. 3 illustrates a cross sectional overview of centrifugal pump according to another embodiment of the disclosure. A centrifugal pump 10 for pumping a multiphase suspension containing liquid, solid material and gas, comprises

- a pump housing 11 having a suspension inlet 12 and a suspension outlet 13 and a flow channel 110 between the inlet 12 and the outlet 13,
- a shaft 14 mounted by bearings for rotation about its center axis A-A,
- an impeller 18 which is rotatable by the shaft 14, in alignment with the inlet 12 and arranged to be rotated about the axis A-A in the flow channel 110,
- gas collecting openings 20 for gas removal arranged in the flow channel 110,
- the inlet end 120 of the flow channel 110 includes a number of static vanes 2 comprising gas collecting openings 20, the vanes 2 are extending radially from an inner wall 111 of the flow channel 110 toward the center of the flow channel 110, the vanes 2 are located upstream of the impeller 18.

The embodiment shown in FIG. 3 is otherwise similar to the embodiment of FIG. 2 but the embodiment of FIG. 3 also comprises a rotatable inducer 4 arranged in flow direction upstream of the vanes 2. The inducer 4 and the impeller 18 are rotatable by the common shaft 14 as shown in FIG. 3 or by separate shafts or a rotating device or means (not shown in Figures). In the embodiment of FIG. 3 having a common shaft 14 for both impeller 18 and the inducer 4 the vanes 2 can optionally include a gas collecting opening 20 at the vane 2 end so that a clearance between the vane 2 end and the shaft 14 for a gas bubble layer to enter to the clearance and further to the gas collecting opening 20 is provided. As in a rotating flow of multiphase suspension the gas phase has a tendency for find its way to the center of the stream, this location for gas collecting openings is very effective. The function of the inducer 4 is to feed the multiphase suspension toward the flow channel 110 and the impeller 18.

Figure 4:
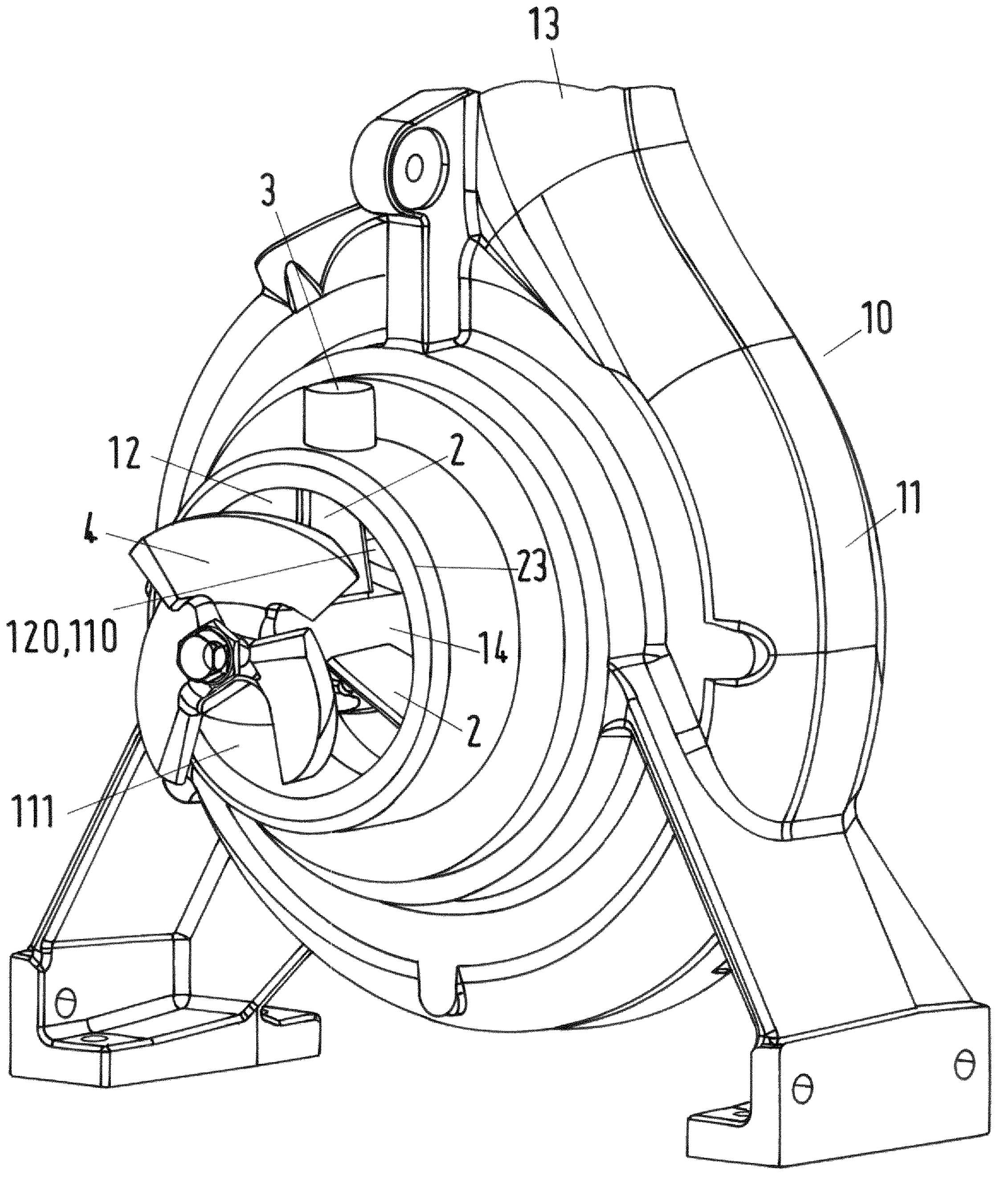
FIG. 4 illustrates an overview of a centrifugal pump according to an embodiment of the invention.

FIG. 4 illustrates an embodiment of the disclosure, a centrifugal pump 10 for pumping a multiphase suspension containing liquid, solid material and gas, the pump comprising:

- a pump housing 11 having a suspension inlet 12 and a suspension outlet 13 and a flow channel 110 between the inlet 12 and the outlet 13,
- a shaft 14 mounted by bearings for rotation about its center axis,
- an impeller which is rotatable by the shaft 14, in alignment with the inlet 12 and arranged to be rotated about the axis in the flow channel 110,
- gas collecting openings for gas removal arranged in the flow channel 110,
- the inlet end 120 of the flow channel 110 includes a number of static vanes 2 comprising gas collecting openings, the vanes 2 are extending radially from an inner wall 111 of the flow channel 110 toward the center of the flow channel 110, the vanes 2 are located upstream of the impeller but downstream of the inducer 4. FIG. 4 shows an embodiment where the vanes 2 extend radially from a tubular element 23 is configured to the inlet end 120 of the flow channel 110. The tubular element 23 comprises an annular ring or flange attachable to the pump housing 11.

Figure 5A:
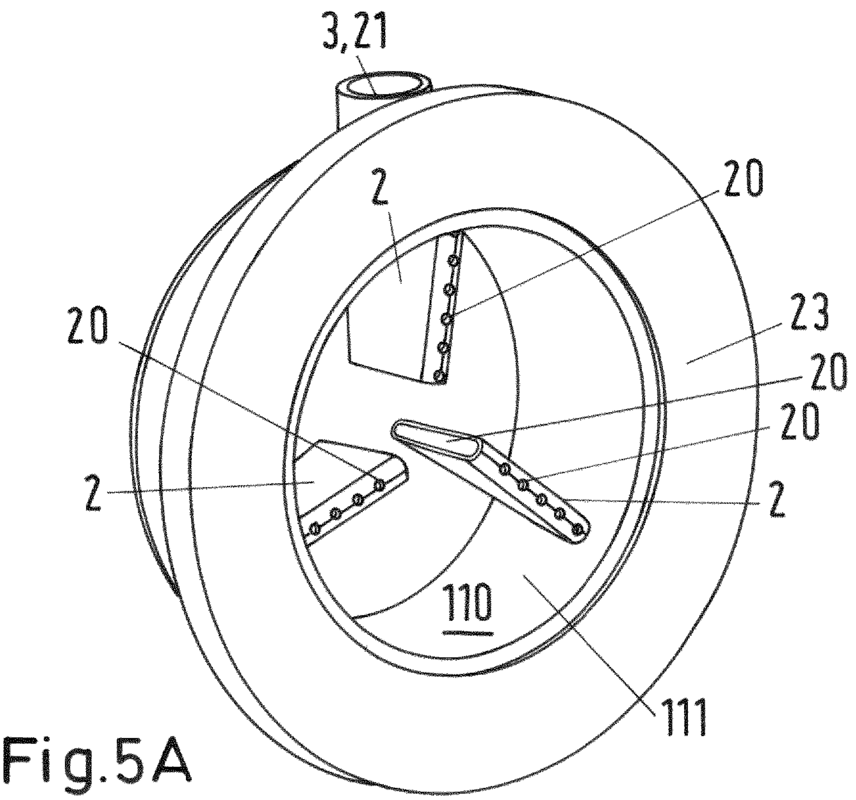
FIG. 5A and FIG. 5B illustrates an embodiment of the gas removal device.
Figure 5B:
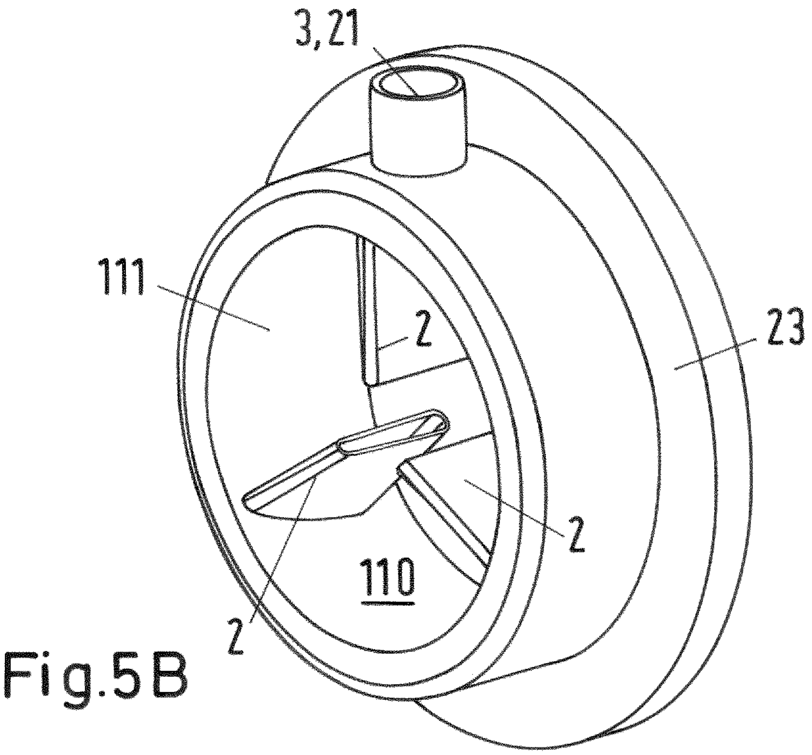

FIG. 5A and FIG. 5B illustrates an embodiment of a gas removal device for use in a centrifugal pump. The gas removal device comprises a tubular element 23 having a first axial end and a second axial end and a flow channel 110 between the ends, the gas removal device is configured to be coupled to an inlet of a centrifugal pump, the gas removal device comprises static vanes 2 extending radially from an inner wall 111 of the flow channel 110 toward the center of the flow channel 110, and the vanes 2 include gas collecting openings 20, the gas collecting openings 20 are connected via gas channels 21 to a system for collecting the gas 3, the gas removal device is configured to be located axially upstream of an impeller of the centrifugal pump.

Figure 6:
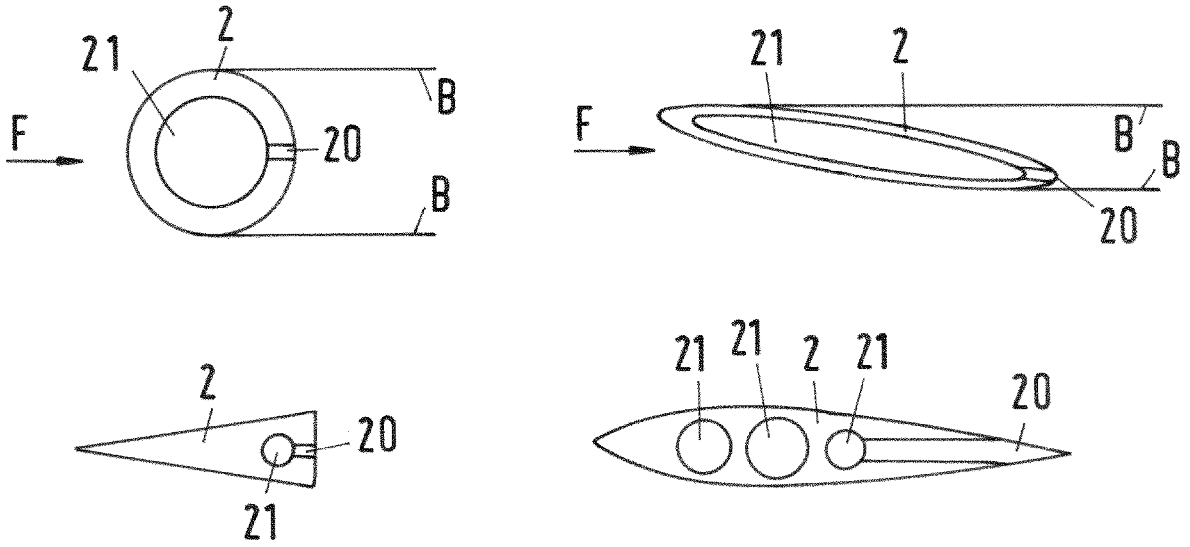
FIG. 6 illustrates some embodiments of possible cross sections of static vanes utilized in embodiments of the invention.

FIG. 6 illustrates some possible embodiments for the vane 2 cross sections. The vanes 2 can have an annular, elliptical, triangular or wing shaped outer cross section in the flow direction of the suspension. The selection of the shape is highly dependent on the properties of the multiphase suspension, different suspensions require different shape. From this cross sectional view one can note some embodiments how the gas collecting openings 20 can be connected to gas channels 21 configured through the vane 2. In these embodiments the gas collecting openings 20 are disposed at a trailing edge of the vane. Also other possibilities are available, but these on figures have been noted to function properly and significantly reduce or substantially eliminate clogging. One other possibility is that the gas collecting openings are disposed at a backside B of the vane 2, in respect to the flow direction F when in use. In FIG. 6 this backside is illustrated in accordance with the annular shaped vane 2 and with the elliptical vane 2. The flow direction F is indicated with an arrow and backside B is a surface area of the vane 3 that is located opposite to the flow side and between two parallel lines, both being tangent to the vane and parallel to the flow direction.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the disclosure, as defined in the appended claims. The details mentioned in connection with any embodiment above can be used in connection with another embodiment when such combination is technically feasible.

The invention claimed is:

1. A centrifugal pump for pumping a multiphase suspension containing liquid, solid material and gas, the pump comprising:

- a pump housing having a suspension inlet and a suspension outlet and a flow channel between the inlet and the outlet;
- a shaft mounted by bearings so as to be capable of rotating about an axis;
- an impeller rotatable by the shaft, in alignment with the suspension inlet and arranged to be rotated about the axis in the flow channel;
- gas collecting openings configured to remove gas arranged in the flow channel, an end of the flow channel at the inlet includes a number of static vanes comprising the gas collecting openings connected to gas channels extending through the static vanes, the static vanes extending radially from an inner wall of the flow channel toward a center of the flow channel, and the vanes disposed upstream of the impeller,
- wherein the gas collecting openings are disposed at a trailing edge of a respective vane, and/or the gas collecting openings are provided at a backside of the respective vane, with respect to a flow direction when in use.

2. The centrifugal pump according to claim 1, wherein the vanes have an annular, elliptical triangular or wing shaped outer cross section in a flow direction of the suspension.

3. The centrifugal pump according to claim 1, wherein the gas collecting openings are disposed at a respective vane end facing radially towards the axis.

4. The centrifugal pump according to claim 1, wherein the static vanes extend radially from a tubular element which is disposed at the end of the flow channel at the inlet.

5. The centrifugal pump according to claim 1, wherein the vanes are attached to the pump housing at the end of the flow channel at the inlet.

6. The centrifugal pump according to claim 1, wherein a rotatable inducer is arranged in a flow direction upstream of the vanes.

7. The centrifugal pump according to claim 6, wherein the inducer and the impeller are rotatable by the shaft or by separate shafts or a rotating device.

8. The centrifugal pump according to claim 3, wherein a gas collecting opening of the gas collecting openings is disposed at an end of the respective vane, a clearance is disposed between the vane end and the shaft for a gas bubble layer to enter to the clearance and to further enter the gas collecting opening.

9. The centrifugal pump according to claim 4, wherein the tubular element comprises an annular ring or flange attachable to the pump housing.

10. The centrifugal pump according to claim 1, wherein the gas collecting openings are connected to a system for collecting the gas.

11. The centrifugal pump according to claim 10, wherein the system for collecting gas is configured to provide a pressure difference between the gas in the suspension and outside of the centrifugal pump.

12. The centrifugal pump according to claim 1, wherein the pump is configured for multiphase suspension having, a consistency of cellulosic fibers of 0.1 to 18 weight % (wt %) or other multiphase suspension having a consistency of 0.1 to 20 wt %.

13. The centrifugal pump according to claim 1, wherein the number of vanes is 1 to 6.

14. The centrifugal pump according to claim 1, wherein the number of vanes is 2 to 4 vanes.

15. A gas removal device configured to be coupled to an inlet of a centrifugal pump, the gas removal device comprising:

a tubular element having a first axial end and a second axial end and a flow channel between the first and second axial ends;

static vanes extending radially from an inner wall of the flow channel toward the center of the flow channel, the static vanes including gas collecting openings connected to gas channels extending through the vanes, the gas removal device is configured to be located axially upstream of an impeller of the centrifugal pump, wherein the gas collecting openings are disposed at a trailing edge of a respective vane, and/or the gas collecting openings are provided at a backside of the respective vane, with respect to a flow direction when in use.

* * * * *